United States Patent [19]

Heuner et al.

[11] 3,755,694

[45] Aug. 28, 1973

[54] MONOSTABLE/ASTABLE MULTIVIBRATOR

[75] Inventors: Robert Charles Heuner, Bound Brook; Joseph Peter Paradise, North Bergen, both of N.J.

[73] Assignee: RCA Corporation, New York, N.Y.

[22] Filed: Jan. 5, 1972

[21] Appl. No.: 215,571

[52] U.S. Cl. .................. 307/276, 307/247, 307/273, 328/195, 328/196, 331/145

[51] Int. Cl. .............................................. H03k 3/30

[58] Field of Search .................... 307/247, 260, 273, 307/276, 269; 328/59–62, 207, 195, 196; 331/113 R, 145

[56] References Cited

UNITED STATES PATENTS

| | | | |
|---|---|---|---|
| 3,037,114 | 5/1962 | Bier et al. | 328/196 X |
| 3,142,025 | 7/1964 | Roberts | 307/276 X |
| 3,158,757 | 11/1964 | Rywak | 331/113 R |
| 3,671,881 | 6/1972 | Yorganjian | 331/145 X |
| 3,339,157 | 8/1967 | Fiorino | 307/228 X |
| 3,539,926 | 11/1970 | Breikss | 307/265 X |
| 3,395,362 | 7/1968 | Sutherland | 331/57 |
| 3,576,496 | 4/1971 | Garagnon | 307/273 X |
| 3,331,032 | 7/1967 | Miller | 307/269 |
| 3,437,938 | 4/1969 | Krygowski | 307/269 X |

*Primary Examiner*—Stanley D. Miller, Jr.
*Attorney*—H. Christoffersen and Samuel Cohen

[57] ABSTRACT

A multivibrator circuit which can be selectively operated in a monostable mode or an astable mode. In the astable mode, either gatable or free-running operation is permitted. In the monostable mode, the multivibrator circuit can be arranged to operate on either the positive-going or the negative-going edge of a trigger signal. Control logic circuitry renders the duration of the input signal inconsequential in affecting the duration of the output signal. An improved oscillator circuit portion permits faster recovery thereof whereby the multivibrator circuit can operate more rapidly.

17 Claims, 7 Drawing Figures

MONOSTABLE/ASTABLE MULTIVIBRATOR

BACKGROUND OF THE INVENTION

There are known in the art many circuits which perform the function of a multivibrator, either of the monostable or astable type. Many of these multivibrator circuits utilize standard discrete components and/or are being designed to utilize semiconductor devices. For example, some of the semiconductor devices which are incorporated into multivibrator circuits include the so-called metallic oxide semiconductors (MOS). The semiconductor devices are especially useful in integrated circuit arrangements wherein low power consumption by the multivibrator circuits is desired.

Known astable and monostable multivibrator circuits have not been designed to perform both functions, i.e., they are not adaptable for both modes of operation. However, inasmuch as the integrated circuit application of multivibrator circuits is frequently utilized in low power applications, for example, timepieces such as wristwatches and the like, it is desirable to provide as many modes of operation of a single circuit unit in a low power dissipation configuration as is possible.

SUMMARY OF THE INVENTION

The present invention relates to a multivibrator circuit which is capable of operating as a monostable multivibrator circuit or as an astable multivibrator circuit. In addition, logic circuitry is incorporated into the circuit to permit the multivibrator circuit to be triggered by either the positive or the negative-going edge of a pulse when the multivibrator circuit is operating in the monostable mode. In other embodiments, provision may be made wherein the circuit can be utilized to establish output signals which have a predetermined relationship to the input signal. These embodiments can be produced by incorporating a retriggering operation in the circuit or by including an external counter circuit therewith or the like.

DESCRIPTION OF THE PREFERRED EMBODIMENT

Figure 1:
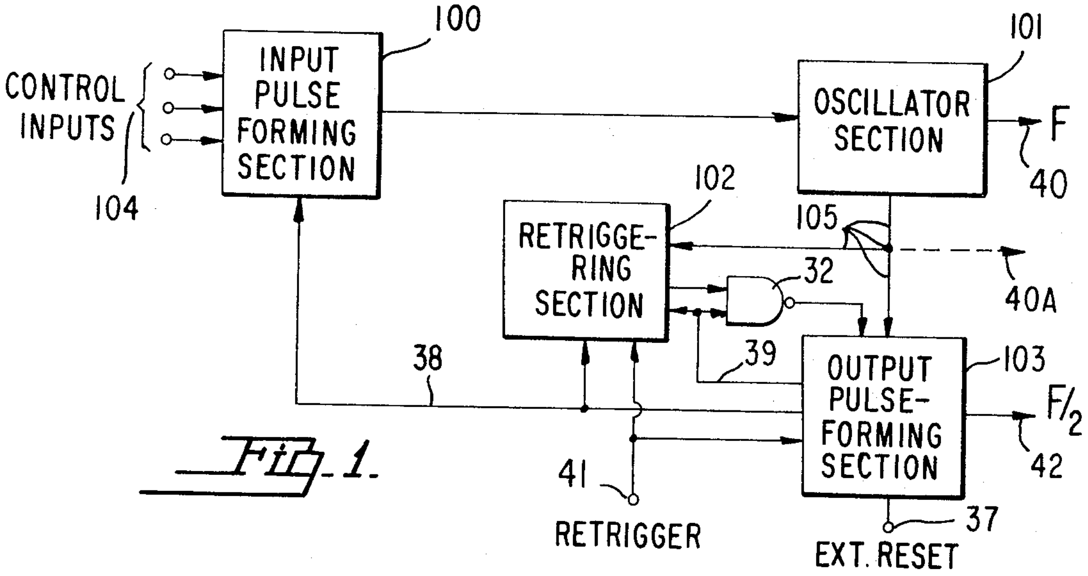
FIG. 1 is a block diagram of one embodiment of the instant invention.

In the following description and in the drawings, the same reference numeral is applied to components which are the same.

In the following description, the terms "high level" or "positive" or "binary 1" are intended to be used interchangeably when referring to signal conditions. Similarly, the terms "low level" or "negative" or "binary 0" are intended to be used interchangeably when referring to signal conditions. These terms are not intended to be absolute conditions but refer to relative conditions of the signals.

Referring now to the block diagram shown in FIG. 1, a brief outline of the circuit and its operation is presented. A plurality of control inputs (i.e. input signals which will be described in detail subsequently) are supplied to the input terminals designated 104. Input terminals 104 are connected to input pulse forming section 100 which operates upon the signals supplied at the input terminals and forms the signals appropriately for suitable operation. The signals produced by input pulse forming section 100 in response to the input signals at terminals 104 are supplied to oscillator section 101. The oscillator section will be described in detail in the description of the circuit of FIG. 2. Oscillator section 101 provides an output signal of frequency F at output terminal 40. In addition, oscillator section 101 supplies the same signal to retriggering section 102 and output pulse forming section 103. These signals are supplied at circuit point 105 which is intended to incorporate the junction as shown, and the lead lines or conduction paths associated therewith electrically. In some applications, it may be desirable to obtain the output signal of frequency F at output terminal 40A (shown in dashed line) connected at junction 105.

The signal from oscillator section 101 to output pulse forming section 103 causes section 103 to operate such that an output signal of frequency F/2 is provided at output terminal 42. In addition, the signal at terminal 105 from oscillator section 101 selectively affects operation of retriggering section 102. When retriggering section 102 is operative, it produces a signal which is supplied to one input of logic circuit 32. In this case, logic circuit 32 is a NAND gate. Another output terminal of output pulse forming section 103 is connected to a second input of NAND gate 32 and to another input of retriggering section 102. In addition, another output terminal of output section 103 is connected to an input of retriggering section 102 and to the input pulse forming section 100 via line 38.

An external reset signal is supplied at terminal 37 and is applied to output pulse forming section 103. Also, an external retrigger signal is applied to terminal 41 and from thence to retriggering section 102 and to output section 103. Typically, the retrigger signal will be supplied by one of the control inputs as will be described infra.

In general, input pulse forming section 100 operates upon the signals supplied at input terminals 104 and produces an appropriate output signal which is supplied to oscillator section 101. This signal is termed the Enable signal. In accordance with the signal supplied thereto, oscillator section 101 will be selectively rendered operative to produce the output signal of frequency F at terminal 40. Concurrently, an output signal (also of frequency F and substantially identical to the output signal at terminal 40) is supplied via circuit point 105 to retriggering section 102 and to output pulse forming section 103. The signal causes output pulse forming section 103 to produce the output signal of frequency F/2 at output terminal 42. In addition, depending upon the Retrigger signal which may be concurrently supplied at terminal 41, the signal from oscillator 101 at circuit point 105 causes retriggering section 102 to supply a signal to one input of NAND gate 32. Output pulse forming section 103 produces a signal upon line 39, which signal is also supplied to NAND gate 32. When the appropriate signals are supplied thereto, NAND gate 32 is operative to supply a signal to another input of output pulse forming section 103 to control the operation thereof. In general, the absence of a Retrigger signal will permit NAND gate 32 to supply a signal which affects operation of output pulse forming section 103 such that the overall circuit operation is terminated thereby in a prescribed time period. Conversely, application of a Retrigger signal at terminal 41 causes the output signal at terminal 42 to remain in a prescribed condition until no further retriggering signals occur. The signal supplied on line 38 is the signal which causes retriggering section 102 and input pulse forming section 100 to return to the initial conditions and thereby either terminate the circuit operation or prepare the circuit to act upon additional input signals at terminals 104.

An external reset signal may be selectively applied at terminal 37 to force the output pulse forming section into a prescribed condition wherein the output signals produced thereby affect the remainder of the circuit and terminate operation thereof.

Figure 2:
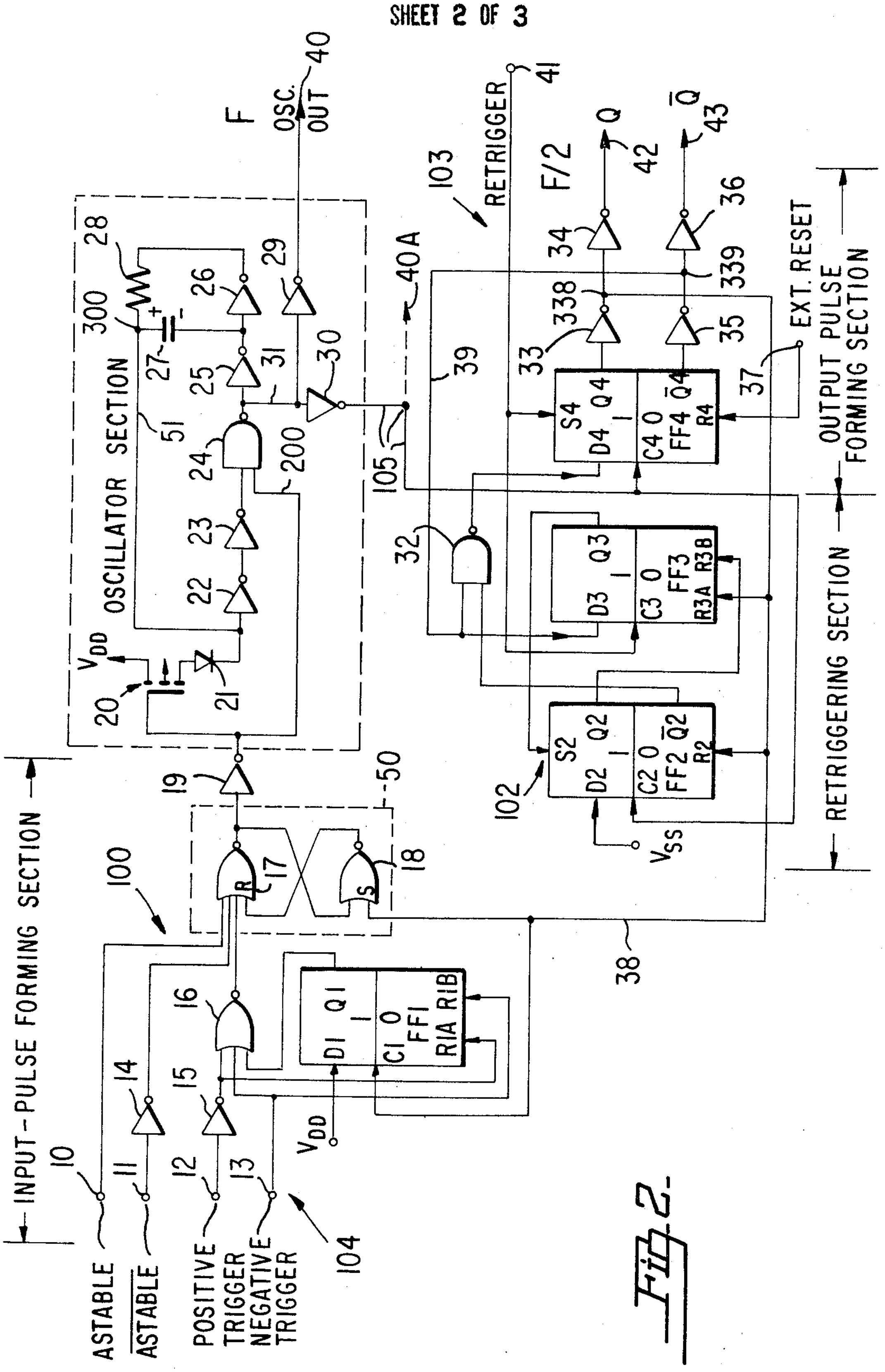
FIG. 2 is a logic diagram of the circuit shown in FIG. 1.

Referring now to FIG. 2, there is shown a logic diagram of one embodiment of the instant invention. Input terminal 10 receives the ASTABLE signal while input terminal 11 receives the $\overline{\text{ASTABLE}}$ input signal. Input terminal 10 is connected to one input of NOR gate 17 which forms a portion of flip-flop 50. Input terminal 11 is connected to the input of inverter 14 which has the output terminal thereof connected to another input of NOR gate 17. Typically, the ASTABLE signal is a low level signal in the quiescent condition and switches to the high level to effect operation of the circuit in the ASTABLE mode. Conversely, the $\overline{\text{ASTABLE}}$ signal is normally a high level signal and switches to the low level to effect operation of the circuit in the $\overline{\text{ASTABLE}}$ mode. The ASTABLE and $\overline{\text{ASTABLE}}$ signals control the astable operation of the multivibrator and selectively activate the oscillator section of the circuit.

The Positive Trigger signal is supplied to input 12 while the Negative Trigger signal is supplied to input terminal 13. In this circuit embodiment, the Positive Trigger signal is normally a low level signal (e.g. ground potential) and switches to the high level to initiate the appropriate circuit action, i.e. POSITIVE TRIGGER operation in response to a Positive Trigger signal. The Negative Trigger signal is normally a high level signal and switches to the low level to start the appropriate circuit action, i.e. NEGATIVE TRIGGER operation in response to a Negative Trigger signal. Terminal 12 is connected via inverter 15 to one input of NOR gate 16 and to reset terminal R1A of flip-flop FF1. Input terminal 13 is connected to one input of NOR gate 16 and to reset terminal R1B of flip-flop FF1. Another input of NOR gate 16 is connected to the Q1 output of flip-flop FF1. The output of NOR gate 16 is connected to a further input of NOR gate 17. The R input of gate 17 is connected to the output of NOR gate 18. The output of NOR gate 17 is connected to an input of NOR gate 18 and the input of inverter 19. The S input of NOR gate 18 is connected to an output of output pulse forming section 103 as described hereinafter.

The output of inverter 19 is connected to the gate electrode of a P-MOS semiconductor 20. One end of the conduction path of semiconductor 20 is connected to a suitable source $V_{DD}$ which may be a suitable positive reference potential. The other terminal of the conduction path of semiconductor 20 is connected to the anode of diode 21 which has the cathode thereof connected to the input of inverter 22. As noted, semiconductor 20 is, in this embodiment, a P-MOS device. P-MOS devices are known in the art and are rendered conductive when the gate electrode is relatively negative with respect to at least one terminal of the conduction path. In this case, when the gate electrode is relatively negative with respect to the voltage supplied to the source electrode by source $V_{DD}$, conduction through P-MOS device 20 and rectifier diode 21 occurs. When semiconductor 20 and diode 21 are conducting, a clamp signal is supplied to the input of inverter 22 as described hereinafter.

The output of inverter 19 is also connected to one input of NAND gate 24 which is connected to operate as a gating device in the oscillator network whereby operation of the oscillator section can be effectively controlled. In addition, when an appropriate enable signal is supplied to NAND gate 24 from inverter 19, NAND gate 24 operates as an inverter in the oscillator network. Conversely, when a different signal (e.g. low level) is supplied thereto by inverter 19, NAND gate 24 is clamped and produces a continuous high level output signal. Of course, the operation of NAND gate 24 is related to the signal supplied by inverter 23 as described infra. The output of NAND gate 24 is connected to the input of inverter 25. The output of inverter 25 is connected to the input of inverter 26 as well as to one side of capacitor 27. The output of inverter 26 is connected to one terminal of resistor 28 which is returned to a common junction or node 300 at the other side of capacitor 27. Node 300 is connected to the input of inverter 22 via line 51 so that node 300, line 51 and the input of inverter 22 are substantially electrically identical. The output of inverter 22 is connected to the input of inverter 23 while the output of inverter 23 is connected to the second input of NAND gate 24. The output of the oscillator section is obtained at terminal 40 which is the output terminal of inverter 29. The input terminal of inverter 29 is connected via line terminal 31 to the output of NAND gate 24.

Before describing the remainder of the circuit, the operation of oscillator section 101 will be described. Initially, it is assumed that the signal supplied at line 200 from the output of inverter 19 is a relatively low signal. As will be seen hereinafter, a low level signal on line 200 inactivates the oscillator section and indicates that no input signal has been supplied to terminals 104. Since a NAND gate produces a low level signal in response to all high level input signals and a high level output signal in response to one or more low level input signals, NAND gate 24 produces a continuous high level output signal at this time. This high level output signal is inverted by inverter 25 which supplies a low level signal to one side of capacitor 27 and to the input of inverter 26. Inverter 26 inverts the signal supplied thereto by inverter 25 to produce a high level output signal which is supplied to the other side of capacitor 27 and to the input of inverter 22 (via line 51). Consequently, capacitor 27 is charged in the + − configuration as shown. In addition, inverter 22 produces a low level signal which is inverted by inverter 23 to provide a high level signal at the second input of NAND gate 24. However, so long as the signal from inverter 19 is at the low level, the oscillator is inactivated due to the operation of NAND gate 24.

Moreover, the low level signal supplied by inverter 19 is supplied to the gate electrode of P-MOS semiconductor device 20 whereby this device is rendered conductive. Consequently, a relatively high signal $V_{DD}$ is supplied via the conduction path of semiconductor device 20 and diode 21 to the input of inverter 22. This high level signal has the effect of clamping node 300 at the high level. Moreover, when the oscillator circuit has been inactivated, a rapid recovery path for capacitor 27 is provided via semiconductor 20. Of course, at this time a high level signal is also supplied by the output of inverter 26 via resistor 28 so that the circuit operations are compatible.

If, now, inverter 19 supplies a high level enable signal along line 200, NAND gate 24 produces a low level output signal. Concurrently, the high level signal supplied by inverter 19 is also applied to the gate electrode of semiconductor device 20 whereby this device is rendered nonconductive. Consequently, line 51 is no longer connected to source $V_{DD}$. The low level output signal from NAND gate 24 is inverted by inverter 25 and a high level signal is supplied to capacitor 27 whereby the voltage at node 300 increases rapidly (e.g. toward $2V_{DD}$) inasmuch as the voltage across capacitor 27 cannot change instantaneously. The high level signal is inverted by inverter 26 and a low level signal is applied from inverter 26 via resistor 28 to the other side of capacitor 27 (i.e. to node 300). As a result, the voltage supplied to the input of inverter 22 via line 51 decreases as a function of the RC time constant of resistor 28 and capacitor 27. When this voltage decreases to the critical level, i.e. the transfer voltage of inverter 22, this signal is inverted and produces a high level signal. The high level signal supplied from inverter 22 to the input of inverter 23 is inverted whereby a low level signal is supplied to the input of NAND gate 24. As suggested supra, any low level input to NAND gate 24 causes a high level output signal to be supplied thereby. Consequently, a high level signal is now supplied to and inverted by inverter 25. Thus, a low level signal is applied to and inverted by inverter 26. Consequently, the signal conditions and, thus, the charge conditions at (and the voltage across) capacitor 27 revert to the initially described conditions in accordance with the RC time constant. Furthermore, when the high level signal produced by inverter 26 and supplied to the input of inverter 22 via resistor 28 reaches the critical level, inverter 22 operates to invert the signal and produce a low level signal. The low level signal supplied to inverter 23 is inverted thereby and a high level signal is supplied to NAND gate 24. Since the enable input at line 200 is still a high level signal, a low level signal is produced by NAND gate 24. This low level signal is inverted by inverter 25 so that a high level signal is applied to one side of capacitor 27 and to the input of inverter 26 which inverts the signal, producing a low level signal at the other terminal of capacitor 27. Consequently, the polarity across capacitor 27 is reversed from that shown and the RC timing circuit is again utilized.

Thus, in summation it may be seen that an important part of the system herein described is the RC astable multivibrator in oscillator section 101. This oscillator section includes an odd number of inverter stages where one of the inverter stages is a gated inverter (NAND gate 24). Moreover, the multivibrator includes a single R (resistor 28) and a single C (capacitor 27) which provide the RC timing for the circuit. By appropriate selection of the R and C values, the appropriate time duration or frequency of the circuit can be controlled. Moroever, as suggested supra, depending upon the output level of the several inverters, at any instant capacitor 27 will be charging or discharging through resistor 28. When the waveform on line 51 passes through the transfer voltage of inverter 22, this inverter will switch and cause successive switching of the other inverters connected in circuit therewith. Consequently, the waveform at line 51 (i.e. the input of inverter 22) will be exponentially increasing or decreasing with discontinuities between these exponential curves, which discontinuities occur at the transfer point of inverter 22. The discontinuities in the waveform are equal in magnitude to $V_{DD}$ during the switching instant.

Normally, the exponential charging is undesirable in the case of complementary MOS circuitry (referred to as COS/MOS) inasmuch as this operation results in excessive power consumption due to the fact that at certain times both the "N" and the "P" type MOS units are in the conductive state at the same time. Inasmuch as this circuit is contemplated for use in the integrated circuit form (and preferably using COS/MOS) two important techniques are utilized to minimize the power disipation in the oscillator circuit described. The techniques which are utilized are to raise the impedance of the semiconductor devices utilized in the several inverters and to include additional inverters in the circuit.

These techniques are utilized inasmuch as increasing the impedance of the semiconductor devices, in proportion to the degree of sloppiness (or lack of definition) of the input waveforms, dictates that the current through the semiconductor devices of the several inverters is limited during the time when both devices are conductive. The additional inverters, which are included in the circuit, increase the loop gain of the system, thereby sharpening the waveform of the succeeding stages and providing sharp waveforms for the final driving inverters, viz. inverters 25 and 26 in this embodiment. Inverters 25 and 26 are designed to include relatively low resistance devices. The inclusion of low resistance devices permits more accurate time period definition and sharper output pulses. This latter effect is produced due to more rapid charging and discharging of capacitor 27 through devices 25 and/or 26. While not limited thereto, it has been determined that five inverters, in series, is an optimum arrangement for the oscillator circuit.

As suggested supra, the output of the oscillator section is produced at terminal 40, which is the output of inverter 29. The input of inverter 29 receives the signal from the oscillator along line 31, which is connected to the output of gate 24. The output signal has a frequency F which, as suggested supra, is determined as a function of the RC time constant of the oscillator circuit.

In addition, the output signal at line 31 is supplied to the input of inverter 30. The output signal from inverter 30 is supplied along circuit point 105 to the clock terminal C4 of flip-flop FF4. In addition, the signal at circuit point 105 is supplied to the clock terminal C2 of flip-flop FF2. The Q4 output of flip-flop FF4 is connected to the input of inverter 33. The output of inverter 33 is connected to the input of inverter 34. The output of inverter 34 is connected to output terminal 42. The signal produced at output terminal 42 is equivalent to the Q4 signal produced by flip-flop FF4. The output signal at terminal 42 has a frequency F/2 as will be seen hereinafter. The $\bar{Q}4$ output of flip-flop FF4 is connected to the input of inverter 35. The output of inverter 35 is connected to the input of inverter 36. The output of inverter 36 is connected to output terminal 43 at which terminal is produced the $\bar{Q}4$ output signal. The $\bar{Q}4$ output signal has the same frequency as, but is complementary to, the Q4 output signal produced at terminal 42. In addition, the $\bar{Q}4$ signal at line 38 (i.e. the output signal from inverter 33) is supplied to reset terminal R3A of flip-flop FF3 and to reset terminal R2 of flip-flop FF2 as well as to the set input terminal S of NOR gate 18 and the clock terminal C1 of flip-flop FF1. As will be described hereinafter, the $\bar{Q}4$ signal from terminal 338 (i.e. the output terminal of inverter 33) is utilized to set the NOR gate flip-flop 50 whereby this flip-flop is disabled at the end of a cycle.

Likewise, the Q4 output signal at terminal 339 (i.e. the output terminal of inverter 35) is supplied to one input of NAND gate 32 and to the D3 input of flip-flop FF3. The Q3 output of flip-flop FF3 is connected to the set input S2 of flip-flop FF2. The Q2 output of flip-flop FF2 is connected to the reset terminal R3B of flip-flop FF3. The $\bar{Q}2$ output of flip-flop FF2 is connected to another input of NAND gate 32. The D2 input of flip-flop FF2 is connected to a suitable source $V_{SS}$ for example a ground potential or low level source. The output of NAND gate 32 is connected to the D4 input terminal of flip-flop FF4. The set terminal S4 of flip-flop FF4 and clock terminal C3 of flip-flop FF3 are connected to receive the RETRIGGER signal at terminal 41. The reset terminal R4 of flip-flop FF4 is connected to receive the external reset signal at terminal 37.

Before continuing with the description, the flip-flop circuits are explained. Each of flip-flops FF1-FF4 is of similar configuration and operation. For example, the clock or toggle signal is supplied to the clock terminal C. The state of the flip-flop is switched by the positive-going edge of any clock signal. Typically, when a trigger type clock signal is supplied to the flip-flop, the information or signal at the D terminal is transferred to the Q terminal. For example, if a low level signal is applied to terminal D, this low level signal will be transferred to the Q output terminal when the appropriate flip-flop is triggered.

In each of these flip-flops, a set terminal S and at least one reset terminal R are provided. When a high level signal is supplied to the set terminal S, the Q output signal is forced to the high or positive level. This condition occurs whether or not a clock signal is supplied to the clock terminal. Similarly, when a high level signal is supplied to the reset terminal R, the $\bar{Q}$ signal is forced to a positive or high level signal. Moreover, the $\bar{Q}$ output is forced high regardless of which of the reset terminals receives the reset signal. This operation of the flip-flops applies generally as will be seen hereinafter.

The circuit described hereinabove is capable of several modes of operation. For example, the circuit may operate as an astable multivibrator. The astable multivibrator may be true-gated, complement-gated or free-running. In order to produce the "true-gated" type of operation, a relatively high or positive ASTABLE signal is supplied at input terminal 10. However, initially at least, the ASTABLE signal is a low level signal and is supplied to NOR gate 17 along with all low level signals as defined subsequently. As a result, NOR gate 17 produces a high level output signal. This signal is inverted by inverter 19 so that a low level signal is supplied to NAND gate 24 whereby gate 24 is forced to produce a high level output signal. This condition of gate 24, as suggested supra, renders the oscillator section inactive.

When normal "true-gated" operation is intended, a high level $\overline{\text{ASTABLE}}$ signal is maintained at terminal 11 and inverted by inverter 14. Consequently, the signals supplied to the input terminals of NOR gate 17 from inverter 14 and terminal 10 are both low level signals until the circuit is activated by a high level ASTABLE signal at terminal 10. This high level signal causes gate 17 to produce a low level signal which is inverted by inverter 19. Thus, a high level (Enable) signal is supplied to oscillator section 101 and oscillator operation is permitted.

Meanwhile, the signal supplied to NOR gate 17 from NOR gate 16 is a low level signal inasmuch as one or more of the input signals supplied to NOR gate 16 are high level signals. That is, during any type of astable operation, the POSITIVE TRIGGER signal applied at terminal 12 is defined to be a low level signal and the NEGATIVE TRIGGER signal supplied at terminal 13 is defined to be a high level signal. Furthermore, the Retrigger and external Reset signals are also defined to be low level signals during any type of astable operation. The high level signal at terminal 13 is applied to NOR gate 16. Also, the low level signal at terminal 12 is inverted by inverter 15 whereby another high level signal is applied to gate 16. These signals are sufficient to cause gate 16 to produce a low level signal. In addition, the high level signal at terminal 13 is applied to reset terminal R1 of flip-flop FF1 whereby the Q1 output signal from flip-flop FF1 is a low level signal and is supplied to gate 16. Also, the Q4 output of flip-flop FF4, in the absence of a reset signal or the like, is defined to be a low level signal. This signal is inverted by inverter 33 such that a high level signal is applied to terminal 338. The high level signal at terminal 338 is supplied to set input S of NOR gate 18 and to clock terminal C1 of flip-flop FF1 along line 38. The signal at clock terminal C1 would have previously transferred the $V_{DD}$ signal to the Q1 output terminal. However, the signal at terminal 13 overrides this signal. Thus, only one low level input signal is supplied to NOR gate 16. Moreover, the signal conditions at gate 16 are not material during ASTABLE operation since gate 17 receives a high level signal at terminal 10. That is, by definition, application of all low level input signals to a NOR gate causes the gate to produce a high level output signal. Consequently, NOR gate 16 and NOR gate 18 each produce a low level output signal as a result of the application of at least one high level input signal. The low level output signals of NOR gates 16 and 18 are applied to inputs of NOR gate 17 along with a high level signal from terminal 10. Therefore gate 17 also produces a low level output signal.

When NOR gate 17 produces the low level output signal, this low level output signal is applied to an input terminal of NOR gate 18. However, flip-flop 50 does not latch in this condition since a high level signal is applied to the S terminal of gate 18. The low level signal is also applied by gate 17 to inverter 19 which produces a high level output signal. The high level signal from inverter 19 is applied to semiconductor device 20 and renders this device nonconductive. Moreover, the high level signal is supplied along line 200 to NAND gate 24 such that this gate is enabled. Thus, oscillator circuit operation occurs and is controlled by the timing function established by the RC network comprising resistor 28 and capacitor 27.

Free-running multivibrator operation is produced so long as the ASTABLE signal at terminal 10 remains relatively positive. An output signal of frequency F is supplied to output terminal 40. Again, the signal is also supplied via inverter 30 and circuit point 105 to the clock or toggle terminal of flip-flop FF4. Since flip-flop FF4 is toggled by the positive-going edge of each signal supplied thereto, two signal cycles of the oscillator section are required to produce a single signal cycle at the output of flip-flop FF4. Consequently, the signals at terminals 42 and 43 have a frequency F/2 relative to the output signal produced by oscillator section 101.

In addition, in this mode of operation, the signal at circuit point 105 is supplied to the clock or toggle terminal of flip-flop FF2. However, flip-flop FF2 always produces a low level signal at the Q2 output terminal in the astable mode of operation. That is, flip-flop FF2 produces a high level signal at the Q2 output terminal only when a positive-going Retrigger signal is applied to the set terminal S2. Therefore, a low level signal ($V_{SS}$) at D2 is transferred to Q2 of flip-flop FF2 by a clock signal (from circuit point 105) and $\overline{Q2}$ is forced to the high level (and Q2 to the low level) by a positive-going signal at reset terminal R (from terminal 338). Therefore, flip-flop FF2 (in this mode of operation) continuously supplies a low level signal to one input of gate 32.

The other input of NAND gate 32 is connected to the output of inverter 35 at terminal 339. The signal at terminal 339 is the inverter $\overline{Q4}$ signal (i.e. effectively the Q4 signal) from flip-flop FF4. Consequently, in view of the $\overline{Q2}$ signal from flip-flop FF2, NAND gate 32 operates as an inverting gate for the Q4 signal from flip-flop FF4. Therefore, the signal at the D4 terminal of flip-flop FF4 is, essentially, identical to the $\overline{Q4}$ signal from flip-flop FF4. Thus, flip-flop FF4 provides a divide-by-two count for the clock signals supplied thereto and the level of the signal at Q4 or $\overline{Q4}$ switches for evey other signal from oscillator 101. This type of flip-flop operation is well known in the art.

The $\overline{Q4}$ signal at terminal 338 is returned to the S input of gate 18. However, this signal has no net effect on the circuit so long as the signal at terminal 10 remains high and forces gate 17 to produce a low level output signal. The astable multivibrator operation will continue until the high level ASTABLE signal at terminal 10 terminates. Moreover, even if the ASTABLE signal terminates during a cycle of the oscillator, circuit operation continues until the end of the oscillator cycle or until the signal supplied to the S input terminal of gate 18 switches high concurrent with a low level signal at terminal 10. That is, when astable operation begins, the $\overline{Q4}$ signal supplied to the S terminal of gate 18 switches to the low level. Consequently, in conjunction with the low level signal produced by gate 17 (and applied to an input of gate 18), gate 18 produces a high level signal. This high level signal is returned to the input of gate 17 even if the ASTABLE signal at terminal 10 switches to the low level. However, when oscillator 101 again toggles flip-flop FF4, the $\overline{Q4}$ signal switches high, forcing gate 18 to produce a low level signal. Gate 17 then produces a high level output signal and operation of oscillator 101 is terminated.

Thus, so long as the ASTABLE signal is high, the oscillator section is operating and an output signal of frequency F is produced at terminal 40, and output signals of F/2 are produced at terminals 42 and 43. Moreover, while this description relates to "true-gated" astable operation due to application of the high level ASTABLE signal, similar operation (i.e. complement-gated operation) occurs in response to a high level $\overline{\text{ASTABLE}}$ signal. In the case of control by the $\overline{\text{ASTABLE}}$ signal, terminal 10 is clamped to the low level signal. The provision of terminals 10 and 11 permits the circuit to be used with external circuitry of either positive or negative logic. If both terminals 10 and 11 receive high level input signals, a "free-running" type of astable operation occurs.

The circuit herein described can also be used in the monostable mode of operation. In particular, the circuit can operate as a monostable multivibrator and can be selectively responsive to the positive-going edge of the negative-going edge of the input signal. Moreover, the circuit can operate in the monostable mode, with positive-going or negative-going triggering regardless of whether the input or the output signal has greater duration. Obviously, these choices provide four operating combinations. The combinations are (1) positive-going triggering with the input of shorter duration than the output; (2) positive-going triggering with input duration greater than output duration; (3) negative-going triggering with input of shorter duration than the output; and (4) negative-going triggering with input of longer duration than the output.

When the circuit is operating in the monostable mode, some general rules are applicable. For example, ASTABLE signal terminal 10 is tied or clamped to the low level while $\overline{\text{ASTABLE}}$ signal terminal 11 is tied or clamped to the high level. In addition, whichever of the positive or negative trigger signal terminals 12, 13 is not being used to control the circuit is connected to an appropriate source having the same polarity or level as the trigger signal. That is, if a positive-going trigger operation is contemplated, negative trigger terminal 13 is connected to a negative source. Conversely, the positive trigger terminal 12 is connected to a positive source if a negative-going triggering operation is desired. Finally, the type of triggering action which is desired is effected by supplying a pulse of the appropriate polarity and level to the trigger terminals 12 or 13. For example, in order to produce positive-going triggering of the multivibrator, a positive-going pulse is supplied to terminal 12 while terminal 13 is connected to a low level signal or source. As described infra, these conditions are enforcable inasmuch as the circuit operates upon the edge of the input trigger pulse.

Figure 3:
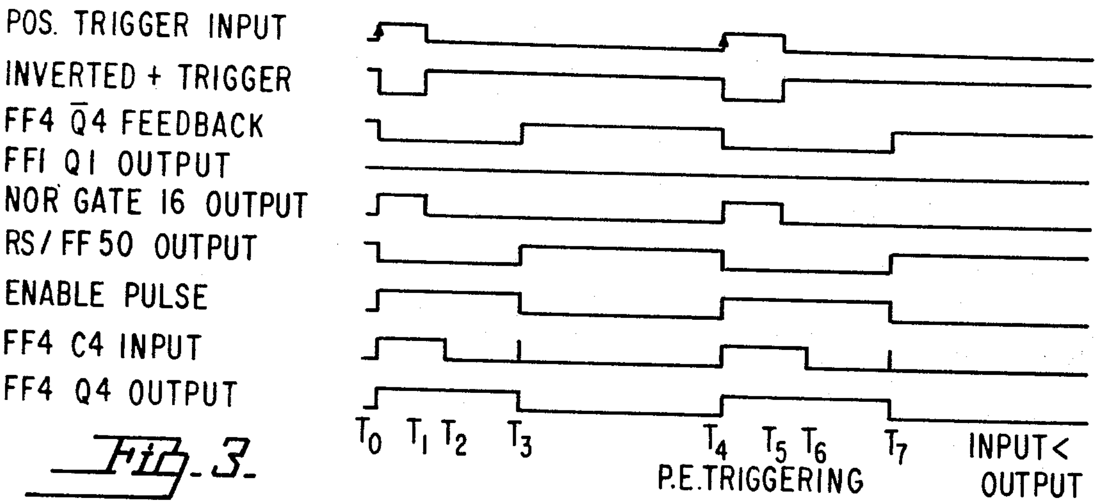
FIGS. 3–6 are timing diagrams representing the operation of the circuit in different operating modes.

Referring now concurrently to FIGS. 2 and 3, there is described the operation of the circuit of FIG. 2 wherein positive edge triggering of the monostable multivibrator circuit occurs and wherein the input signal is of shorter duration than the output signal as shown in FIG. 3. As noted supra, the ASTABLE signal at terminal 10 and the $\overline{\text{ASTABLE}}$ signal at terminal 11 are low and high level signals respectively. Thus, two low level signals are supplied to inputs of NOR gate 17. In addition, the signal supplied to NOR gate 17 from NOR gate 18 is defined to be a low level signal. Also, the signal from NOR gate 16 is initially a low level signal as will be shown. That is, initially, a negative signal is supplied to terminal 12 and is inverted by inverter 15 such that a positive signal is supplied to an input of NOR gate 16. This positive signal at the input of gate 16 produces a low level output signal which is supplied to another input of gate 17. Consequently, gate 17 has all low level input signals and produces a high level output signal which is returned to an input of NOR gate 18 such that flip-flop 50 latches in the condition noted. Additionally, the high level signal from NOR gate 17 is inverted by inverter 19 to produce a low level signal. This low level signal is supplied to the oscillator circuit whereby semiconductor device 20 is rendered conductive to effectively clamp the input of inverter 22 and cause capacitor 27 to charge to the conditions suggested by the plus and minus signs. Moreover, the low level signal is applied via input 200 to gate 24 and this gate produces a high level output. Therefore, the oscillator section is essentially inoperative due to the clamping action produced by gate 24 and semiconductor device 20.

Again referring to NOR gate 16, the negative trigger signal at terminal 13 is defined to a low level signal inasmuch as positive-going trigger action is desired. In addition, this low level signal is applied to the reset terminal R1B of flip-flop FF1 and has little or no effect. However, the Q1 output signal from flip-flop FF1 remains at the relatively low level. That is, the prior application of the high level signal from inverter 15 to reset terminal R1A forced $\bar{Q}1$ to the high level (and thus the Q1 output signal to the low level).

At time period T0, the positive-going edge of the trigger pulse is supplied at terminal 12. This pulse is supplied to inverter 15 which, in turn, supplies a low level signal to an input of NOR gate 16. Consequently, at time period T0, all of the input signals supplied to NOR gate 16 are low level signals whereby NOR gate 16 produces a high level output signal. This high level output signal is supplied to an input of NOR gate 17 and causes NOR gate 17 to produce a low level output signal which is supplied to an input of NOR gate 18. In addition, the low level signal from gate 17 is inverted by inverter 19. The high level signal produced by inverter 19 causes semiconductor device 20 to be rendered nonconductive while enabling gate 24 and, thus, the oscillator section associated therewith.

The low level signal produced by NAND gate 24 (when it is enabled) is inverted by inverter 30 and applied to the clock or toggle input terminal C4 of flip-flop FF4 and to the clock terminal C2 of flip-flop FF2. The toggle or clock signal causes the Q4 output signal of flip-flop FF4 to switch to the high level at time period T0 inasmuch as gate 32 supplies a high level signal to terminal D4 in response to a low level signal at terminal 339. The clock signal at flip-flop FF2 has no effect thereon inasmuch as flip-flop FF2 was reset by the signal supplied to the R input terminal via line 105. Flip-flop FF2 produces a low level signal at the Q output terminal as discussed supra. The low level Q4 signal is supplied to reset terminal R3B of flip-flop FF3 but has no net effect. Flip-flop FF3 remains in the reset condition in response to the Q4 signal supplied to the R3A terminal.

The high level Q4 signal produced by flip-flop FF4 is inverted by inverter 33 and the low level signal at terminal 338 is fed back to the set input S of NOR gate 18 of flip-flop 50. Thus, NOR gate 18 receives all low level signals and produces a high level signal. This high level signal is returned to an input of NOR gate 17. Thus, flip-flop 50 is latched in the condition such that a low level signal is produced thereby. Therefore, the circuit has been triggered and the trigger signal no longer controls the circuit operation.

At time period T1, the positive-going trigger signal terminates and the signal at terminal 12 becomes a low level signal. This low level signal is inverted by inverter 15 such that a high level signal is applied to an input of NOR gate 16 whereby the output signal from NOR gate 16 switches to the low level. The low level signal from NOR gate 16 is applied to an input of NOR gate 17 of flip-flop 50. However, NOR gate 18 is supplying a high level signal so that gate 17 does not change state and the output signal from flip-flop 50 remains at the low level. Therefore, the remainder of the circuit continues to function as described during time T0–T1.

At time period T2, the output signal from oscillator section 101 changes state. That is, the RC time constant for the oscillator circuit has been reached and the signal across capacitor 27 is large enough that inverter 22 is switched. When inverter 22 switches, the other inverters switch and the output signal at line 31 also changes. In this case, the signal supplied to terminal C4 of flip-flop FF4 along line 105 switches from the high to the low level. However, inasmuch as flip-flop FF4 switches only on a positive-going trigger signal, no circuit change is produced by the negative-going clock signal.

However, at time period T3, the oscillator portion of the circuit switches again (as a result of the operation of the RC circuit) and produces (or attempts to produce) a high level signal at the output of NAND gate 24. That is, the standard RC operation of the oscillator circuit portion causes the appropriate action of the several inverters and the NAND gate so that the signal at the output of NAND gate 24 switches to the low level. The signal is applied to and inverted by inverter 30. Thus, a positive-going pulse is supplied to the clock or toggle input C4 of flip-flop FF4. However, as soon as the positive-going signal is supplied thereto, flip-flop FF4 changes state whereby the Q4 output of flip-flop FF4 switches from the high to the low level. The low level signal is supplied to and inverted by inverter 33 such that a high level signal is produced at output terminal 338. This high level signal is fed back to the S input of NOR gate 18 whereby a low level signal is produced by gate 18. This low level signal is supplied to the R input of NOR gate 17 such that NOR gate 17 now has all low level signals applied thereto. Consequently, NOR gate 17 produces a high level output signal which is inverted by inverter 19. The low level signal from inverter 19 is supplied to the oscillator section whereby semiconductor device 20 is rendered operative and immediately clamps the input of inverter 22. Concurrently, the low level signal is supplied to an input of NAND gate 24 whereby the output thereof is clamped at the high level.

Thus, it is seen that the output signal at terminal 42 is a function of the conditions of input signal and the oscillator section. That is, a single input signal triggers the circuit to produce a single output signal. The single output signal is equal to a full cycle of the oscillator section. By controlling the RC time constant of the oscillator section, the duration of the output pulse at terminal 42 (between T0 and T3) is controlled. In addition, by obtaining the output signal at terminal 42 (or terminal 43) the spike-like pulse produced at the output of the oscillator at time period T3 is eliminated. Typically, the spike-like pulse is immaterial in the circuit operation inasmuch as the spike-like pulse is of such short duration relative to the remainder of the pulses in the circuit. However, in the event that the spike-like pulse could be an undesirable condition, for example on following circuitry (not shown), the output signal at terminal 42 eliminates this spike-like pulse. Furthermore, a more stable output signal is produced by flip-flop FF4 than by oscillator 101. That is, the oscillator output signal is dependent upon the operation of several inverters and, thus, the threshold voltages, etc., thereof. Flip-flop FF4 is a clearly definable circuit with fixed operating points whereby greater stability of output signal period is achieved at terminal 42.

Still referring to the wave shape diagram of FIG. 3, the circuit operation where positive edge triggering with the input signal having a shorter duration than the output signal is repetitive. That is, the operation described as occurring between time period T0 and T3 is repeated at time period T4 and so forth. That is, at time period T4, the positive-going edge of a trigger pulse is supplied at terminal 12. The operation of the other signals, as defined at time period T0, is repeated. Likewise, at time periods T5, T6 and T7 the signal conditions are repeated and the circuit operates as described supra.

Figure 4:
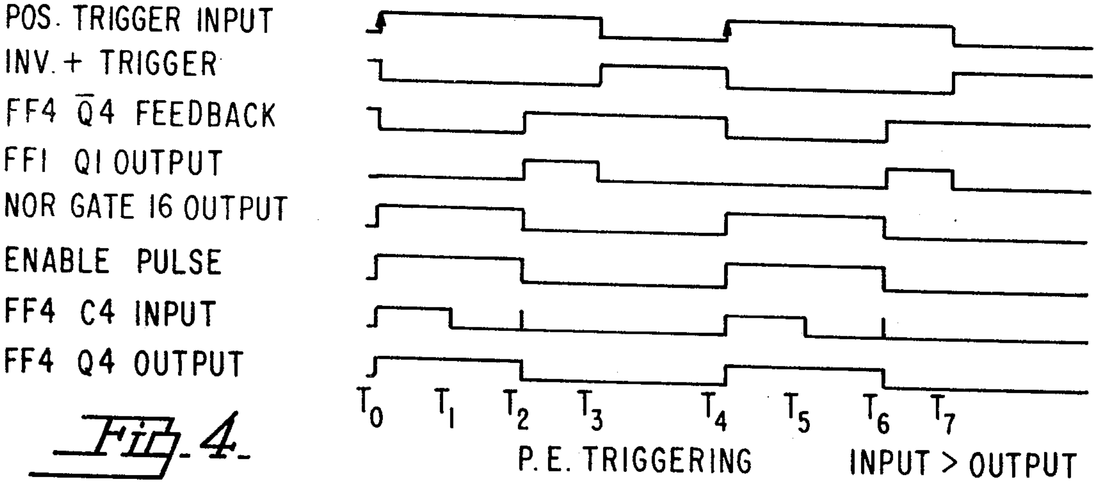

Referring now to FIGS. 2 and 4 concurrently, the operation of the circuit shown in FIG. 2 in response to positive edge or positive-going triggering but with the input signal greater in time duration than the output signal as shown in FIG. 4 is described. In describing this operation of the circuit, the initial conditions, suggested relative to the timing diagram of FIG. 3 apply. That is, the ASTABLE and $\overline{\text{ASTABLE}}$ signals are low and high level signals respectively. Also, the negative trigger signal at terminal 13 is clamped to a low level signal. Thus, when the positive trigger signal is at the low level, inverter 15 inverts the signal and supplies a high level signal to an input of NOR gate 16. Thus, NOR gate 16 produces a low level output signal which is applied to NOR gate 17 in conjunction with the other low level input signals whereby NOR gate 17 produces a high level output signal which is supplied to an input of NOR gate 18 whereby flip-flop 50 latches in this condition. In addition, the high level output signal from NOR gate 17 is supplied to and inverted by inverter 19 whereby a low level signal is applied to oscillator section 101. With this low level signal, NAND gate 24 is, effectively, clamped to produce a positive output signal. In addition, semiconductor device 20 is rendered conductive whereby the input of inverter 22 is clamped to a high level. Thus, the oscillator section is, essentially, inactive initially.

At time period T0, the positive-going edge of a trigger input pulse is applied. The signal is inverted by inverter 15 whereby a low level signal is applied to the input of NOR gate 16. NOR gate 16, thus, produces a high level output signal which is applied to an input of NOR gate 17. NOR gate 17, thus, produces a low level output signal which is supplied to an input of NOR gate 18. In addition, the low level output signal from NOR gate 17 is inverted by inverter 19 and a high level signal is applied to oscillator section 101. The high level signal is applied to the gate electrode of semiconductor device 20 which is thereby turned off or rendered nonconductive. Concurrently, the high level signal is applied to the input of NAND gate 24 which is, thus, rendered operative. At this time the oscillator section operates in the astable or free-running mode as described supra.

In addition, gate 24 produces a low level signal which is inverted by inverter 30 and applied, as a high level signal, to the clock or toggle input C4 of flip-flop FF4. Inasmuch as the output of gate 32 (applied at terminal D4) is a high level signal, the clock signal causes flip-flop FF4 to assume the condition wherein the Q4 output thereof achieves the high level. Gate 32 produces a high level output signal in response to the low level signal at terminal 339. The high level Q4 signal is inverted by inverter 33 and returned to the other input of NOR gate 18 via line 38 such that NOR gate 18 produces a high level output signal which is fed back to the R input of NOR gate 17 whereby flip-flop 50 latches in the condition described. The high level clock signal is also supplied to the clock terminal C2 of flip-flop FF2. However, the high level signal at terminal 338 has caused flip-flop FF2 to be reset whereby the clock signal is overriden and the Q2 output signal of flip-flop FF2 is a high level signal. Therefore, gate 32 continues to function as an inverter for the Q4 output signal at terminal 339 as described supra.

At time period T1, the signal produced by oscillator section 101 changes state and a low level signal is applied to the clock terminal of flip-flop FF4 and to the clock terminal of flip-flop FF2. However, inasmuch as the flip-flops are triggered only by a positive-going signal, no effect is produced thereby.

At time period T2, the oscillator section again switches state and produces a low level signal at the output of NAND gate 24. This signal is inverted and a high level signal is supplied to the clock terminal of flip-flop FF4 whereby the output status of the flip-flop is also switched by the positive-going edge of this signal. Consequently, the Q4 output of flip-flop FF4 switches from the high to the low level. This low level signal is supplied to inverter 33 such that a high level signal is produced at terminal 338. The high level output signal at terminal 338 is returned to the set input S of NOR gate 18 whereby NOR gate 18 produces a low level signal which is applied to the R input of NOR gate 17 so that the status of flip-flop 50 is changed.

In addition, the high level signal at terminal 338 is applied to the clock or toggle input C1 of flip-flop FF1 which is triggered thereby. Inasmuch as terminal D1 of flip-flop FF1 is connected to source $V_{DD}$, the Q1 output signal of flip-flop FF1 switches to the high level. Consequently, a high level signal is applied to an input of NOR gate 16 whereby a low level output signal is produced thereby. This low level signal (and the high level signal at the S input of NOR gate 18) is acted upon by flip-flop 50 to ultimately produce a low level signal at the output of inverter 19 (i.e. enable pulse) whereby the oscillator section is effectively disabled. Thus, even though the input signal continues until time period T3, a single output signal of fixed duration is produced at the Q4 output terminal of flip-flop FF4 from time period T0 to time period T2.

Thus, it is seen that the output of NOR gate 16 and the enable signal supplied to NAND gate 24 will never be a high level signal for a time duration which is longer than the duration of the output pulse. Consequently, the monostable produces a single output signal for each input signal. In the event that the logic circuitry which is used to disable the oscillator section were omitted, spurious operation of the circuit and unwanted output signals could possibly occur with an elongated trigger input signal. With the circuitry as described herein, flip-flop FF1 will be reset due to the application of a high level signal to the R1 terminal when the positive trigger signal switches low. Consequently, the circuit conditions are returned to the initial status.

Figure 5:
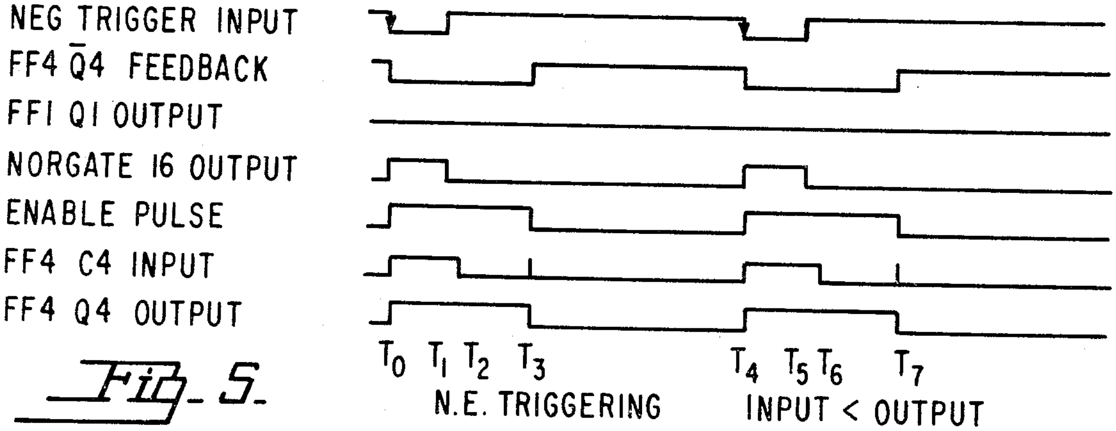

In order to describe the operation which occurs with a negative-going input signal of shorter duration than the output signal, concurrent reference is made to FIGS. 2 and 5. For operation on a negative-going trigger pulse, the initial conditions of the input signals is not significantly different than the conditions described supra. That is, the ASTABLE and $\overline{\text{ASTABLE}}$ signals are low and high level signals respectively whereby low level signals are supplied to inputs of NOR gate 17. In addition, the positive trigger pulse signal at input terminal 12 is clamped or tied to the high level. However, the signal is inverted and a low level signal is supplied to an input of NOR gate 16. Initially, the negative trigger signal supplied to terminal 13 is a high level signal which is applied to the input of NOR gate 16 whereby a low level signal is produced thereby and supplied to NOR gate 17. Moreover, the high level signal at terminal 13 is supplied to the reset terminal R2 and forces the Q output signal of flip-flop FF1 to be a low level signal. In addition to the signals described supra, NOR gate 18 supplies a low level signal to the R input of NOR gate 17 so that NOR gate 17 produces a high level output signal which is inverted by inverter 19. Thus, a low level signal is applied to semiconductor device 20 and NAND gate 24. Consequently, the oscillator section 101 is not operative whereby NAND gate 24 produces a high level output signal which is inverted by inverter 30 and supplied to the clock or toggle terminal C4 of flip-flop FF4. The Q4 output of flip-flop FF4 is a low level signal which is inverted by inverter 33 and supplied, as a positive signal, to the S input of NOR gate 18 whereby a low level output signal is produced thereby. This circuit operation is similar to the other operation described supra.

At time period T0, the signal applied at negative trigger terminal 13 switches from the high to the low level. This low level signal causes NOR gate 16 to produce a high level signal inasmuch as all of the inputs to the NOR gate are now low level signals. Moreover, the reset R2 signal is removed, but flip-flop FF1 remains as previously conditioned. This application of a high level input signal to NOR gate 17 causes this gate to produce a low level signal which is applied to one input of NOR gate 18 and to inverter 19. Inverter 19 inverts the low level signal and supplies a high level signal to the gate electrode of semiconductor device 20 and to an input of NAND gate 24. NAND gate 24 is then rendered operative while semiconductor device 20 is rendered nonconductive. Consequently, oscillator section 101 begins the typical operation thereof and supplies, via inverter 30, a positive-going signal to the clock or toggle terminal of flip-flop FF4. Consequently, flip-flop FF4 switches and the Q4 output signal of flip-flop FF4 switches to the high level. Inverter 33 inverts this signal and supplies a low level signal to NOR gate 18. As a result, gate 18 produces a high level signal which is returned to gate 17 whereby flip-flop 50 latches.

As was the case previously described, the circuit is in a substantially latched condition with oscillator section 101 essentially free-running. At time period T1, the trigger input signal returns to the high level. This signal change has the effect of causing NOR gate 16 to switch and produce a low level output signal. In addition, the high level signal at reset terminal R1B assures that the Q1 output of flip-flop FF1 produces a low level signal.

At time period T2, oscillator section 101, due to normal operation thereof, produces a low level signal at the output of inverter 30. However, inasmuch as flip-flop FF4 (and flip-flop FF2) does not trigger on negative-going signals, no net effect to the circuit occurs. However, at time period T3, when the output signal produced by oscillator section 101 on line 105 is switched to the high level, flip-flop FF4 is triggered thereby and the Q4 output is switched to a low level. This low level signal is inverted by inverter 33 and applied, as the high level $\overline{Q4}$ feedback of flip-flop FF4, to the S input of NOR gate 18. As a result, NOR gate 18 produces a low level output signal which is applied to input R of NOR gate 17 such that NOR gate 17 produces a high level output signal. This high level signal is inverted by inverter 19 and supplied to oscillator section 101 whereby the oscillator section is rendered inactive.

It will be seen in this type of operation, that the output signal of NOR gate 16 follows the negative trigger pulse and is of shorter duration than the output pulse of the circuit. At time period T3, the circuit is in the steady state condition and remains therein until time period T4 when another negative-going trigger input signal is applied to terminal 13. At this time, the circuit operation as described from T0 to T3 is repeated as is easily seen in the figure. A detailed description of this repeated operation is deemed unnecessary at this point.

Figure 6:
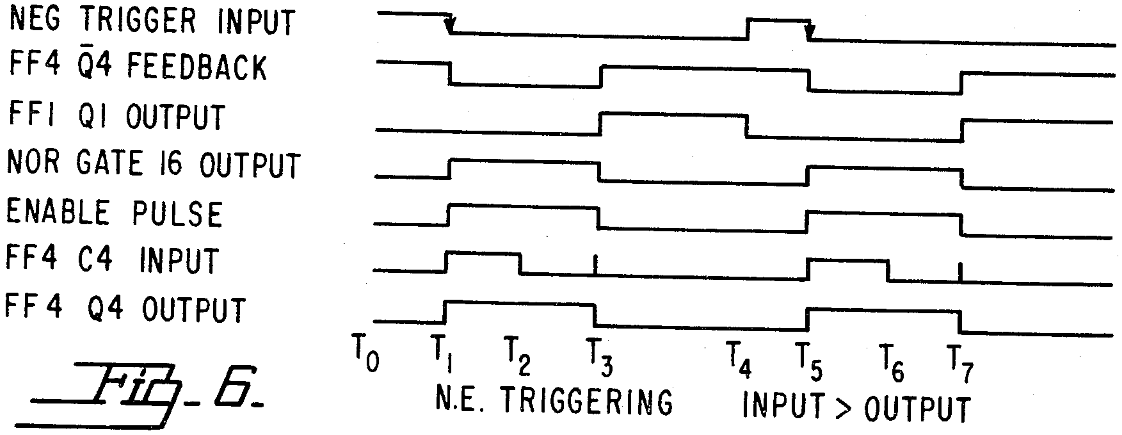

Referring now to FIG. 6, the operation of the circuit of FIG. 2 with negative-going triggering and with an input signal of greater duration than the output signal is described. As in the preceding discussions, the input signals are such that the ASTABLE and $\overline{\text{ASTABLE}}$ are low and high level signals, respectively, so that low level signals are supplied to the inputs of NOR gate 17. Likewise, NOR gate 18 supplies a low level signal to input R of NOR gate 17. Terminal 12 is clamped to a high level wherein a low level signal is applied by inverter 15 to an input of NOR gate 16 and to terminal R1A of flip-flop FF1. Initially, as shown at time T0, the input signal at terminal 13 is a high level signal which is supplied to another input of NOR gate 16 and to terminal R1B of flip-flop FF1. The Q1 output of flip-flop FF1 is a low level signal due to the high level signal at terminal R1B. The Q1 signal is also supplied to NOR gate 16. A low level output signal is produced by NOR gate 16 and is supplied to NOR gate 17. Therefore, NOR gate 17 produces a high level output signal which is inverted by inverter 19 and supplied to oscillator section 101 to effectively inhibit operation of the oscillator as described supra.

At time period T1, the signal supplied to terminal 13 becomes a low level signal. Inasmuch as all of the signals supplied to NOR gate 16 are now low level signals, this gate produces a high level output signal. The high level signal is supplied to NOR gate 17 and causes this gate to produce a low level output signal. The low level output signal from NOR gate 17 is supplied to an input of NOR gate 18. In addition, the low level output signal from NOR gate 17 is inverted by inverter 19 and a high level signal (enable pulse) is supplied to oscillator section 101 whereby the oscillator section, as described supra, begins free-running operation. Again, the operation of the circuit is similar to that described supra inasmuch as the high level clock signal supplied to clock terminal C4 of flip-flop FF4 from inverter 30 of oscillator section 101 causes the Q4 output of flip-flop FF4 to switch to the high level. Thus, a low level signal is provided at terminal 338 and applied to input S of NOR gate 18 via line 38 whereupon flip-flop 50 latches in the appropriate condition.

At time period T2, a low level signal is supplied to the clock terminal of flip-flop FF4 by the oscillator section. That is, the oscillator output signal has changed state as a result of achieving the RC time constant. However, this signal is ineffective to produce any significant circuit changes inasmuch as the flip-flops FF2 and FF4 toggle only on positive-going signals.

However, at time period T3, the oscillator output signal switches to the high level which causes flip-flop FF4 to trigger. The Q4 output of flip-flop FF4 switches from the high to the low level. Thus, a high level signal is produced at terminal 338 and supplied to terminal S of NOR gate 18 along line 38 whereby a low level signal is produced thereby and supplied to the R input of gate 17. In addition, this high level Q4 signal is supplied to the clock terminal C1 of flip-flop FF1 whereby the Q1 output of flip-flop FF1 switches from the low to the high level (as controlled by source $V_{DD}$ connected at terminal D1) and is supplied to an input of NOR gate 16. Thus, the NOR gate 16 output signal switches from the high to the low level and is supplied to an input of NOR gate 17. Consequently, a high level signal is produced by NOR gate 17 and inverted by inverter 19 such that a low level signal is applied to oscillator section 101. The low level signal from inverter 19 renders the oscillator circuit portion substantially inactive.

Again, it is noted that the output signal is of a prescribed time duration regardless of the length of the trigger input signal. Moreover, it is noted that because of the operation of the logic control circuit, the output signal of NOR gate 17 and the enable pulse on line 200 are equal to (or less than) the duration of the output signal at terminal 42. Consequently, more accurate control of the output signal is obtainable. Furthermore, with this circuit, true monostable operation is achieved. The output signal is of a prescribed polarity and duration for any input signal condition so long as initial conditions are followed.

Referring again to the circuit shown in FIG. 2, it is possible to provide a circuit which produces a single output pulse of relatively long duration for a high frequency input signal. That is, by connecting retrigger terminal 41 to the positive trigger terminal 12, the multivibrator circuit can be retriggered by the input pulses. In this mode of operation, the output pulse at terminal 42 will remain high so long as the cycle time for the input signal is shorter than the output pulse period. That is, a circuit operation as suggested in the timing diagram of FIG. 3 will apply. However, a high level input signal will be applied to the retrigger terminal 41 whenever an input signal is applied to positive trigger terminal 12. Consequently, the application of each high level input signal will, essentially, retrigger the circuit by supplying a signal to set input terminal S4 of flip-flop FF4 as well as to clock or toggle input terminal C3 of flip-flop FF3.

In the retrigger mode of operation, the signals applied to the circuit are substantially similar to those which are normally applied in establishing operation in the positive trigger portion of the monostable multivibrator mode of operation. That is, the ASTABLE and $\overline{\text{ASTABLE}}$ signals are defined to be low and high level signals, respectively. In addition, the Negative Trigger signal is defined to be a low level signal and the Positive Trigger signal is, initially, a low level signal but will switch to the high level with the application of a trigger cignal. Thus, the input signals to gate 16 include a high level signal from the output of inverter 15 which high level signal is sufficient to cause gate 16 to produce a low level output signal. Incidentally, the other input signals to NOR gate 16 are low level signals as defined by the Negative Trigger signal applied at terminal 13 and the Q1 output of flip-flop FF1. The Q1 signal is a low level signal inasmuch as a high level signal is supplied to reset terminal R1A of flip-flop FF1.

In accordance with prior operation, a high level signal is supplied to the clock terminal C1 of flip-flop FF1 and to the S set input of NOR gate 18. Consequently, NOR gate 18 produces a negative output signal which is supplied to NOR gate 17. NOR gate 17, initially, receives all low level input signals whereby a high level output signal is produced thereby and supplied to an input of NOR gate 18 as well as to the input of inverter 19. Inverter 19 inverts the signal and supplies a low level signal to oscillator section 101 whereby semiconductor device 20 is rendered conductive and NAND gate 24 is, essentially, clamped to produce a high level output signal. This high level output signal is inverted by inverter 30 and supplied to clock terminal C4 of flip-flop FF4 as well as to clock terminal C2 of flip-flop FF2.

In addition, other initial signal conditions are important and are defined herewith. The External Reset signal is clamped to the low level. Retrigger signal terminal 41, as noted, is connected to positive trigger terminal 12 whereby signals of the same level are applied at both terminals. That is, a low level Retrigger signal is initially supplied to set terminal S4 of flip-flop FF4 and to clock terminal C3 of flip-flop FF3. These signals have virtually no effect on the circuit and operation as described supra occurs. In addition, the high level output signal at terminal 38, the output of inverter 33 associated with flip-flop FF4, is applied to reset terminal R3A of flip-flop FF3 and to reset terminal R2 of flip-flop FF2. The high level signals at the reset terminals of flip-flops FF2 and FF3 force the $\overline{Q}2$ and $\overline{Q}3$ output signals of these flip-flops to be high level signals. Conversely, a low level signal is produced at the Q outputs of these flip-flops. Thus, a low level signal is supplied from the Q2 terminal of flip-flop FF2 to the reset terminal R3B of flip-flop FF3. Similarly, a low level signal at the Q3 terminal of flip-flop FF3 is supplied to the set terminal S2 of flip-flop FF2. Flip-flops FF2 and FF3 are not positively affected by these signals. In addition, a high level signal at the $\overline{Q}2$ terminal of flip-flop FF2 is supplied to an input of NAND gate 32 which also receives a low level input signal from terminal 339.

Initially, when a high level signal is supplied at terminal 12 (and at terminal 41) the circuit operation is similar to the monostable mode of operation on the positive-going edge of a trigger signal where the input signal is shorter than the output signal. That is, the signal at terminal 12 switches to the high level, is inverted by inverter 15, and supplied to gate 16. Therefore, NOR gate 16 has all low level input signals supplied thereto. The signal at reset terminal R1A of flip-flop FF1 also switches to the low level. In response to the applied input signals, NOR gate 16 produces a high level output signal which is supplied to an input of NOR gate 17. Thus, NOR gate 17 produces a low level output signal which is supplied to an input of NOR gate 18 and to inverter 19. Inverter 19 supplies a high level signal to oscillator section 101 whereby semiconductor device 20 is rendered inactive and NAND gate 24 is enabled so that the oscillator is activated. The output of NAND gate 24 switches to the low level whereby, through the action of inverter 30, a high level signal is supplied to clock terminal C4 of flip-flop FF4 and to clock terminal C2 of flip-flop FF2. With the application of the positive-going clock signals, flip-flops FF4 and FF2 are each operative to transfer the signal at terminal D to terminal Q, respectively. In the case of flip-flop FF2, terminal D2 is connected to a low level voltage source $V_{SS}$ whereby a low level signal is transferred to (i.e. maintained at) terminal Q2. However, in the case of flip-flop FF4, terminal D4 has a high level signal supplied thereto from NAND gate 32 and this high level signal is supplied to terminal Q4 of flip-flop FF4. In any event, the Retrigger signal at terminal S4 will force the Q4 signal to the high level. Through the action of inverter 33, a low level signal at terminal 338 is supplied to clock terminal C1 of flip-flop FF1, but the signal has essentially no effect thereupon. In addition, the low level signal at terminal 338 is supplied to input terminal S of NOR gate 18. This gate produces a high level signal which is applied to terminal R of NOR gate 17 so that flip-flop 50 latches in the new condition. Furthermore, the low level signal at terminal 338 is supplied to the rest terminals R2 and R3A of flip-flops FF2 and FF3 whereby the respective $\bar{Q}$ signals thereof are no longer forced into the high level condition. However, no immediate action is performed by these flip-flops.

Concurrently, the $\bar{Q}4$ signal at flip-flop FF4 is switched to the low level signal which is inverted by inverter 35. Therefore, a high level signal is supplied to the input of NAND gate 32 and to the D3 input of flip-flop FF3 from inverter 35. The combination of input signals causes NAND gate 32 to produce a low level signal and supply same to the D4 terminal of flip-flop FF4.

Concurrent with the above-described operation, the positive-going trigger signal is also supplied at Retrigger terminal 41. Thus, a high level signal is supplied to terminal S4 of flip-flop FF4 and to clock terminal C3 of flip-flop FF3. Thus, a high level signal is forced at output terminal Q4 due to the application of the high level signal at terminal S4 of flip-flop FF4. Likewise, the positive-going edge of the Retrigger signal at terminal C3 of flip-flop FF3 causes a transfer of the signal at terminal D3 to terminal Q3. As described supra, this operation dictates that a low level signal be produced at output terminal Q3 of flip-flop FF3 inasmuch as flip-flop FF3 will be clocked before the signal at terminal 39 switches. The low level signal at terminal Q3 is supplied to the set terminal S2 of flip-flop FF2 which previously was a low level signal. Therefore, no change in operation of the flip-flops FF2 and FF3 is detected. Consequently, the application of the positive-going clock signal to terminal C4 of flip-flop FF4 operates as described supra.

When the signal supplied at circuit point 105 achieves the high level (i.e. after the leading positive-going edge of the signal is completed) and during the negative-going transition of the pulse, flip-flops FF4 and FF2 are not effected inasmuch as they are triggered only by positive-going pulses.

As described supra in the positive going trigger operation, if the trigger signal (i.e. the Retrigger signal) is not reapplied, the next positive-going clock pulse supplied to flip-flops FF4 and FF2 at circuit point 105 will cause low level signals to be supplied to the Q output terminals of flip-flops FF2 and FF4. That is, the operation of these flip-flops is dictated as a function of the input signal supplied at the respective terminal D. In the case of flip-flop FF2, terminal D2 is connected to source $V_{SS}$ which is defined to be a low level source. Therefore, in the absence of a signal at the set input terminal S2, flip-flop FF2 will always produce a low level signal at the Q2 output terminal. In addition, terminal D4 of flip-flop FF4 receives a low level signal from NAND gate 32 which receives high level input signals from the $\bar{Q}2$ output of flip-flop FF2 and from terminal 339 at the output of inverter 35. The operation of NAND gate 32 was previously described.

The output signal Q2 of flip-flop FF2 is reestablished to the initial condition at reset terminal R3B of flip-flop FF3. Likewise, the initial conditions at output terminals 338 and 339 associated with flip-flop FF3 are reestablished. As a result of the reestablishment of the initial signal conditions (including a low level Positive Trigger signal), oscillator section 101 is rendered inoperative and the circuit output signals at terminals 42 and 43 achieve a steady state condition.

However, in the retrigger mode, it is contemplated that the Positive Trigger signal and the Retrigger signal are of relatively high frequency. Therefore, the Positive Trigger signal at terminal 12 will be supplied thereto before the output signals from flip-flop FF4 are changed. Thus, flip-flop 50 will not have changed state prior to the reapplication of the Positive Trigger signal. In addition, the Retrigger signal at terminal 41 is applied to terminal S4 of flip-flop FF4 and forces the Q4 signal to the high level. The low level signal $\bar{Q}4$ at terminal 338 (inverted Q4 signal) is supplied to the S input terminal of gate 18. In addition, the high level signal Q4 at terminal 339 (inverted $\bar{Q}4$ signal) is applied to an input of NAND gate 32 and to the D3 input terminal of flip-flop FF3. As described supra, prior to the application of the clock signal at circuit point 105, the signal at terminal 339 was also a high level signal. Consequently, the application of the Retrigger signal to terminal C3 of flip-flop FF3, prior to the clock signal at circuit point 105, transfers the high level signal at terminal D3 to terminal Q3 of flip-flop FF3.

The high level Q3 signal is supplied to the set terminal S2 of flip-flop FF2. Consequently, the signal at terminal Q2 is forced to the high level. The high level signal at terminal Q2 is supplied to the reset terminal R3B of flip-flop FF3 wherein this flip-flop is reset and the signal at the Q3 terminal is forced to the low level signal. This switching operation removes the set signal from the terminal S2 of flip-flop FF2. However, flip-flop FF2 remains in the set condition wherein a low level signal is produced at the $\bar{Q}2$ terminal and supplied to an input of NAND gate 32. Thus, NAND gate 32 is forced to produce a high level output signal. This high level output signal is supplied to terminal D4 of flip-flop FF4. This operation takes place repeatedly so long as the Retrigger signal frequency is high relative to the output signal frequency produced by oscillator section 101.

However, a clock signal at circuit point 105 from the oscillator section 101 is supplied to the clock terminal C2 of flip-flop FF2 and causes the low level signal at terminal D2 to be transferred to terminal Q2. Obviously, the signal at terminal $\overline{Q}2$ switches to the high level. The high level signal at terminal Q2 is supplied to NAND gate 32 which now produces a low level output signal. This low level output signal is supplied to terminal D4 of flip-flop FF4. In the typical operation as described, with a relatively high frequency Retrigger signal at terminal 41, a Retrigger signal is now applied to terminal S4 of flip-flop FF4 and to terminal C3 of flip-flop FF3. The signal at terminal S4 forces the signal at terminal Q4 to be a high level signal while the clock signal at terminal C3 transfers the high level Q4 signal at the D3 terminal to the Q3 terminal of flip-flop FF3 whereupon the operation noted supra continues.

In this operation, flip-flop FF2 is placed in the set condition whereby, ultimately, gate 32 produces a high level signal at terminal D4. Again, a clock signal at terminal C4 will transfer to terminal Q4 whatever signal is at terminal D4. But, it should be noted, that once terminal Q4 of flip-flop FF4 is set to produce a high level signal, this signal level cannot change until the signal at terminal D4 is a low level signal prior to the application of a clock signal from oscillator 101 at circuit point 105.

Since in reviewing the operation of the circuit, each Retrigger signal forces the signal level at terminal D4 to the high level and each clock signal at circuit point 105 forces the signal at terminal D4 to the low level, it is obvious that two clock signals at circuit point 105 from the oscillator 101 are necessary to change the state of the signal at terminal Q4 from a high to a low level signal. Of course, these two clock pulses must be consecutive pulses supplied to flip-flop FF4 without the intermediate application of a Retrigger signal at terminal 41.

As a corollary, it is also seen that the circuit comprising flip-flops FF2 and FF3 along with NAND gate 32 do not interfere with normal operation of the circuit when retrigger terminal 41 is clamped to a low level signal (as in other modes of operation). In this latter condition, flip-flop FF3 is not toggled and flip-flop FF2 always supplies a low level output signal at terminal Q2 and a high level output signal at $\overline{Q}2$ for each clock pulse applied thereto from oscillator section 101. These signal conditions do not effect the operation of flip-flip FF4 and operation of the circuit as described supra continues. However, in the retrigger mode, the Q4 output of flip-flop FF4 is always forced to the high level by a Retrigger signal. As a result, when flip-flop FF3 is toggled by the Retrigger signal, flip-flop FF2 is set and supplies a low level signal to NAND gate 32. As well, flip-flop FF2 resets flip-flop FF3 and thereby removes the set signal from flip-flop FF2.

In addition, an external reset provision is also included in the circuit shown in FIG. 2. External reset terminal 37 is connected to the reset terminal R4 of flip-flop FF4. So long as the external reset signal is tied to the low level, no effect is produced thereby. If, however, the External Reset signal is switched to the high level, the $\overline{Q}4$ output signal of flip-flop FF4 is forced high and the Q4 output signal is forced low, which is the signal condition defined for the initial conditions. That is, the $\overline{Q}4$ signal at terminal 338 is supplied to gate 18 and this gate produces a low level signal. If the input signal is no longer present, oscillator action terminates immediately. In addition, the Q4 signal condition at terminal 339 forces NAND gate 32 to produce a high level signal which is supplied to terminal D4 of flip-flop FF4. If the External Reset signal is at the high level during the initial "power on" condition of the system, there will be no initial output pulse inasmuch as the circuit is forced into the condition defined. Moreover, if the External Reset signal is applied during any output pulse which may be being produced by the circuit, the output pulse is shortened (i.e. terminated) thereby. Thus, the output pulse is controlled insofar as length and duration is concerned by the application of the External Reset signal.

Figure 7:
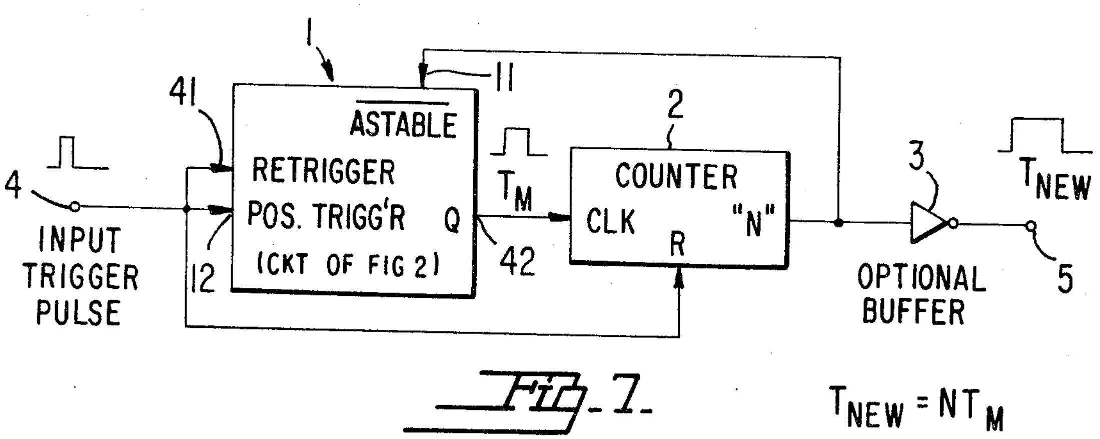
FIG. 7 is a block diagram of one application of the circuit of the instant invention.

Referring now to FIG. 7, there is shown another embodiment of the instant invention wherein the circuit shown in FIG. 2 is suitably connected to a counter circuit to extend the time period of the operation of the monostable device. In this embodiment, block 1 is a block diagram representation of the circuit shown in FIG. 2. Block 2 is a block representation of a suitable counter device which counts to a prescribed number N. Typical and illustrative, but not limitative, of the type of counter included is the RCA COS/MOS CD4017 decade counter. This counter counts from zero through nine. However, any desirable counter having a count of N may be utilized.

Input trigger pulse terminal 4 is connected to Positive Trigger terminal 12 and Retrigger terminal 41 of the circuit (see FIG. 2). The Q output, e.g. terminal 42 is connected to the clock terminal CLK of counter 2. The output terminal "N" of counter 2 is connected to $\overline{\text{ASTABLE}}$ terminal 11 of circuit 1. In addition, the output terminal of counter circuit 2 is connected to an input of an optional buffer 3 which may or may not be desired. The output of operational buffer 3 is connected to output terminal 5. Reset terminal R of counter 2 is also connected to input trigger pulse terminal 4.

In operation, an input signal is supplied to input trigger pulse terminal 4. This positive-going signal operates the circuitry associated with the positive-going trigger and retrigger terminals as described supra. In addition, the input pulse resets counter 2 to the initial condition which may be any desired count, for example zero. The output signal $T_M$ supplied at output terminal Q is supplied to the clock terminal of counter 2. Counter 2 operates in a standard fashion to count the pulses supplied at terminal Q. The output signal from counter 2, in addition to being supplied to output terminal 5, is also supplied to $\overline{\text{ASTABLE}}$ terminal 11 of the monostable circuit 1. After circuit 1 is triggered by the input signal, it will continue to oscillate until a reset pulse is supplied to the $\overline{\text{ASTABLE}}$ terminal. In the application or implementation shown in FIG. 7, the $\overline{\text{ASTABLE}}$ signal is used as an inhibiting input which overrides the normal shut-off condition when $\overline{\text{ASTABLE}}$ is a low level signal. When the signal N is produced by counter 2 and supplied to $\overline{\text{ASTABLE}}$ terminal 11, monostable circuit 1 is rendered nonconductive and inoperative whereby this circuit ceases to oscillate. When the circuit ceases to oscillate, counter 2 is no longer triggered and the output signal $T_{new}$ terminates. Thus, the output signal $T_{new}$ is equal to N times the length of the input signal $T_M$, i.e. $T_{new} = NT_M$.

Thus, there is shown and described a multivibrator circuit which operates in astable or monostable modes. In the astable mode, operation may be gated (true or complement) or free-running. In the monostable mode, operation is triggered by either postive-going or negative-going edges of input trigger pulses and varied trigger pulse widths may be used. Moreover, when operating in the monostable mode, a triggering function may be included by using specialized digital logic circuits. Also, a counting function may be included by addition of external counting logic. Time period expansion is provided when the retriggering or counting functions are included. While several illustrative examples have been given relative to the operation of the circuit, and to the components of the circuit, it should be understood that these examples are illustrative only and not meant to be limitative of the invention. In fact, those skilled in the art may conceive various modifications to the circuit. However, any modifications to the circuit which are included in the purview thereof are meant to be included within this description.

What is claimed is:

1. A multivibrator circuit comprising
input pulse forming means,
said input pulse forming means including a first flip-flop connected to receive input control signals,
gate means connected to receive input control signals, and connected to supply signals to said first flip-flop, and
a second flip-flop connected to receive input control signals and to supply signals to said gate means,
oscillator means,
said oscillator means including a plurality of series connected inverters,
a logic gate connected in series with said series connected inverters and connected to receive enabling signals from said first flip-flop,
said logic gate operating as an inverter when an enabling signal is applied thereto,
output pulse forming means including a third flip-flop connected to receive signals from said oscillator means, and
control means for controlling the status of said third flip-flop.

2. In combination:
oscillator means for supplying alternating output signals;
first bistable means for receiving said alternating output signals;
gate means for supplying a control signal to said first bistable means and connected to receive a signal from said first bistable means;
second bistable means connected to receive said alternating output signals from said oscillator means and to supply signals to said gate means;
third bistable means connected to receive said signal from said second bistable means and to supply a control signal to said second bistable means; and
means for applying control signals to each of said second and third bistable means.

3. In combination:
input pulse forming circuit means;
oscillator circuit means connected to receive a signal from said input pulse forming means and to produce signals representative thereof;
output pulse forming means connected to receive the signals produced by said oscillator circuit means;
retriggering control means connected to receive signals from said oscillator circuit means, from a source of retriggering signals and from said output pulse forming means, and connected to supply signals to said output pulse forming means as a function of the signals supplied thereto; and
gate means in said output pulse forming means connected to receive signals from said retriggering control means and from said output pulse forming means, and connected to supply signals to said output pulse forming means.

4. The combination recited in claim 3 wherein said retriggering control means includes a pair of cross-coupled flip-flops with an output of each connected to an input of the other, one flip-flop responsive to said source of retriggering signals for controlling the other flip-flop, the other flip-flop for both controlling the first flip-flop and supplying said signals to said output pulse forming means.

5. A circuit operable in astable, monostable or gated modes comprising, in combination:
an oscillator;
control circuit means responsive to one set of control signal values for enabling said oscillator for causing continuous oscillations to be produced and responsive to a second set of control signal values for disabling said oscillator;
means in said control circuit means, responsive to a change in the value of one of said second set of control signal values independently of the rate of change of said one signal value, for enabling said oscillator; and
feedback means coupled to said control circuit means and responsive to a given number of cycles of the oscillations produced by said oscillator for causing said control circuit means to disable said oscillator.

6. In a circuit as set forth in claim 5, said means responsive to said second set of control signal values comprising a first logic circuit for effectively opening a feedback path in said oscillator, said means responsive to a change in the value of one of said control signals comprising means for applying said one of said control signals to said logic circuit for causing it again to close said feedback path, and said feedback means comprising a second logic circuit for supplying a signal to said first logic circuit for causing it again to open said feedback path.

7. In a circuit as set forth in claim 6 said second logic circuit including a triggerable flip-flop initially in one state, responsive to an output signal of said flip-flop for applying to a data terminal of said flip-flop a signal initially tending to switch said flip-flop to its second state, and, after said flip-flop has switched to its second state, a signal tending to switch said flip-flop back to its initial state, and means connecting said oscillator to the trigger terminal of said flip-flop for applying to said trigger terminal a trigger signal once each period of said oscillations, whereby said flip-flop is triggered to its second state at the start of one period of oscillation and is triggered back to its first state at the end of one period of said oscillation.

8. A circuit as set forth in claim 7 further including:
means responsive to a change in the value of one of said signals followed by a return of said one signal to its original value followed by a second change in the value of said one signal, all occuring before said flip-flop has returned to its initial state for causing said second logic circuit to apply to said data terminal of said flip-flop a signal tending to maintain said flip-flop in its second state.

9. A circuit as set forth in claim 5, further including means responsive to said given number of cycles of said oscillations for producing a unipolarity pulse having a duration equal to said given number of cycles.

10. A circuit as set forth in claim 5 wherein said control circuit means includes a flip-flop maintained in one state in response to said one set of control values, and placed in its second state in response to said another set of control signal values, and further including means responsive to said change in the value of one of said signals for switching said flip-flop to its first state, and said feedback means including a circuit responsive to said oscillator for switching said flip-flop back to its second state.

11. A circuit capable of operating in an astable, monostable or gated modes comprising, in combination:

an oscillator, first and second logic circuits, the first responsive to a first set of input signals for producing a first output signal, the second responsive to a second set of input signals and also to said first output signal for producing a second output signal, said second output signal for enabling said oscillator to produce continuous oscillations, each said logic circuit being also responsive to a separately applied common feedback signal for changing the condition of both said logic circuits, so that said oscillator is disabled; and feedback means responsive to a given number of oscillations of said oscillator for producing said common feedback signal.

12. The circuit as set forth in claim 11, said first logic circuit comprising:

bistable means set to a first condition by said first set of input signals and placed in a second condition by said common feedback signal; and gate means controlled by said bistable means, said gate means enabled for producing said first output signal in response to said first set of input signals when said bistable means is in said first condition, said gate means disabled from producing said first output signal when said bistable means is in said second condition.

13. The circuit as set forth in claim 11, said second logic circuit comprising:

latch means set to a first condition for producing said second output signal in response to any one of said second set of input signals and said first output signal, said latch means being set to a second condition inhibiting said second output signal in response to said common feedback signal.

14. In combination:

a gated oscillator, enabled by one input signal manifestation for producing continuous oscillations and disabled by another input signal manifestation;

output bistable means having first and second output states being switched therebetween in response to said oscillations produced by said oscillator, and providing a feedback signal for disabling said oscillator; and gate means responsive to a control signal and coupled between an output terminal of said output bistable means and an input terminal thereof, for priming said output bistable means to change its output state in response to said oscillations when the gate means control signal is of a first value and for inhibiting a change of state of said output bistable means when said gate means control signal is of a second value.

15. The combination recited in claim 14 further comprising retrigger control means for providing said gate means control signal to said gate means in response to a retrigger control signal, an output signal from said output bistable means and a signal from said gated oscillator.

16. The combination recited in claim 15 wherein said retrigger control means including first and second cross-coupled flip-flops with an output of each connected to an input of the other so that when the first flip-flop is set to a first condition, the second flip flip is thereby set to a first condition which thereby resets the first flip-flop to a second condition, said first flip-flop being set to said first condition in response to said retrigger control signal.

17. In combination:

a controlled oscillator for producing continuous oscillations in response to a control signal;

bistable means responsive to said oscillations for alternately producing first and second output states;

a first feedback path from said bistable means to said controlled oscillator for disabling said oscillator;

a second feedback path from said bistable means to said bistable means for priming said bistable means to change its output state in response to said oscillations;

gate means within said second feedback path for effectively opening said second feedback path for inhibiting a change in said output state of said bistable means in response to another control signal;

means for providing said another control signal in response to a retriggering signal, another signal from said bistable means and a signal from said controlled oscillator.

* * * * *